(12) United States Patent
Shinichi et al.

(10) Patent No.: US 6,760,650 B2
(45) Date of Patent: Jul. 6, 2004

(54) COMMUNICATION SYSTEM FOR COMMUNICATION BETWEEN IN-VEHICLE TERMINALS AND CENTER, AND IN-VEHICLE TERMINAL EMPLOYED IN COMMUNICATION SYSTEM

(75) Inventors: Hayashi Shinichi, Kobe (JP); Tada Akihito, Toyota (JP); Sugimoto Hironobu, Toyota (JP); Nanba Akimasa, Okazaki (JP); Egawa Toshiaki, Yokohama (JP)

(73) Assignees: Fijitsu Ten Limited, Kobe (JP); Toyota Jidosha Kabushiki Kaisha, Toyota (JP); Aisin Aw Co., Ltd., Anjo (JP); Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/373,021

(22) Filed: Feb. 26, 2003

(65) Prior Publication Data

US 2003/0139857 A1 Jul. 24, 2003

Related U.S. Application Data

(62) Division of application No. 10/105,359, filed on Mar. 26, 2002, which is a division of application No. 09/461,423, filed on Dec. 16, 1999.

(30) Foreign Application Priority Data

Jan. 18, 1999 (JP) .......................................... 11-009649

(51) Int. Cl.[7] .............................................. G06F 17/00
(52) U.S. Cl. .............................. 701/1; 714/22; 717/173
(58) Field of Search ...................... 701/1, 208; 455/418, 455/419; 709/217; 714/15, 22; 717/173, 177, 178

(56) References Cited

U.S. PATENT DOCUMENTS 5,504,801 A    4/1996 Moser et al. ............ 379/29.01

(List continued on next page.)

FOREIGN PATENT DOCUMENTS

| EP | 0 644 515 A1 | 3/1995 |
| EP | 0 811 942 A2 | 12/1997 |
| EP | 0 862 304 A2 | 9/1998 |
| GB | 2 317 791 A | 4/1998 |
| WO | 95 04425 A | 2/1995 |
| WO | 98/39707 | 9/1998 |
| WO | 98/53397 | 11/1998 |

OTHER PUBLICATIONS

U.S. patent application Ser. No. 09/461,423, Hayashi et al., filed Dec. 16, 1999, Fujitsu Ten Limited; Toyota Jidosha Kabushiki Kaisha; Aisin AW Co., LTD.; Denso Corporation; Matsushita Electric Industrial Co., LTD.

(List continued on next page.)

*Primary Examiner*—Tan Q. Nguyen
(74) *Attorney, Agent, or Firm*—Staas & Halsey LLP

(57) ABSTRACT

In a communication system for downloading programs from a center to in-vehicle terminals, a center can check whether downloading has been completed normally or a program is operating normally in an in-vehicle terminal. According to the timing of activating a downloaded program, an in-vehicle terminal checks whether the program is activated to operate normally. The information is transmitted to the center. Based on the information, the center becomes aware of the fact that downloading has been completed without any problem and that the program is operating normally in the in-vehicle terminal.

2 Claims, 10 Drawing Sheets

U.S. PATENT DOCUMENTS

| | | | |
|---|---|---|---|
| 5,544,087 A | 8/1996 | Nakajima et al. | 701/200 |
| 5,649,187 A | 7/1997 | Hornbuckle | 707/10 |
| 5,689,825 A | 11/1997 | Averbuch et al. | 455/418 |
| 5,717,744 A | 2/1998 | Yoshida et al. | 379/100.06 |
| 5,754,526 A | 5/1998 | Kaneko et al. | 370/217 |
| 5,790,796 A | 8/1998 | Sadowsky | 709/221 |
| 5,802,258 A | 9/1998 | Chen | 714/10 |
| 5,805,897 A | 9/1998 | Glowny | 717/178 |
| 5,835,911 A | 11/1998 | Nakagawa et al. | 707/203 |
| 5,845,326 A * | 12/1998 | Hirayama et al. | 711/135 |
| 5,867,781 A * | 2/1999 | Hofmann | 455/419 |
| 5,887,254 A | 3/1999 | Halonen | 455/419 |
| 5,890,075 A | 3/1999 | Cyr et al. | 455/560 |
| 5,937,343 A | 8/1999 | Leung | 455/403 |
| 5,956,480 A | 9/1999 | Kurihara | 714/52 |
| 5,974,461 A * | 10/1999 | Goldman et al. | 709/224 |
| 5,999,876 A | 12/1999 | Irons et al. | 701/115 |
| 6,074,435 A | 6/2000 | Rojest.ang.l | 707/173 |
| 6,094,618 A | 7/2000 | Harada | 701/207 |
| 6,108,598 A | 8/2000 | Sumitani | 701/29 |
| 6,141,683 A | 10/2000 | Kraml et al. | 709/220 |
| 6,175,918 B1 | 1/2001 | Shimizu | 713/1 |
| 6,195,547 B1 | 2/2001 | Corriveau et al. | 455/419 |
| 6,230,082 B1 | 5/2001 | Harada et al. | 701/1 |
| 6,266,774 B1 | 7/2001 | Sampath et al. | 713/201 |
| 6,289,510 B1 | 9/2001 | Nakajima | 717/170 |
| 6,396,805 B2 * | 5/2002 | Romrell | 370/216 |
| 6,438,750 B1 | 8/2002 | Anderson | 717/178 |
| 6,490,616 B1 * | 12/2002 | Maryka et al. | 709/223 |
| 6,526,447 B1 * | 2/2003 | Giammaria | 709/232 |

OTHER PUBLICATIONS

U.S. patent application Ser. No. 10/105,306, Hayashi et al., filed Mar. 26, 2002, Fujitsu Ten Limited; Toyota Jidosha Kabushiki Kaisha; Aisin AW Co., LTD,; Denso Corporation; Matsushita Electric Industrial Co., LTD.

U.S. patent application Ser. No. 10/105,359, Hayashi et al., filed Mar. 26, 2002, Fujitsu Ten Limited; Toyota Jidosha Kabushiki Kaisha; Aisin AW Co., LTD.; Denso Corporation; Matsushita Electric Industrial Co., LTD.

U.S. patent application Ser. No. 10/288,438, Hayashi et al., filed Nov. 6, 2002, Fujitsu Ten Limited; Toyota Jidosha Kabushiki Kaisha; Aisin AW Co., LTD.; Denso Corporation; Matsushita Electric Industrial Co., LTD.

European Search Report in the counterpart European Application EP 99 31 0077 of the parent application 09/461,423 of the above–identified US patent application, dated Jan. 6, 2003 (7 pages).

Partial European Search Report in the counterpart European Application EP 99 31 0077 of the parent application 09/461,423 of the above–identified US patent application, dated Jan. 15, 2002 (4 pages).

* cited by examiner

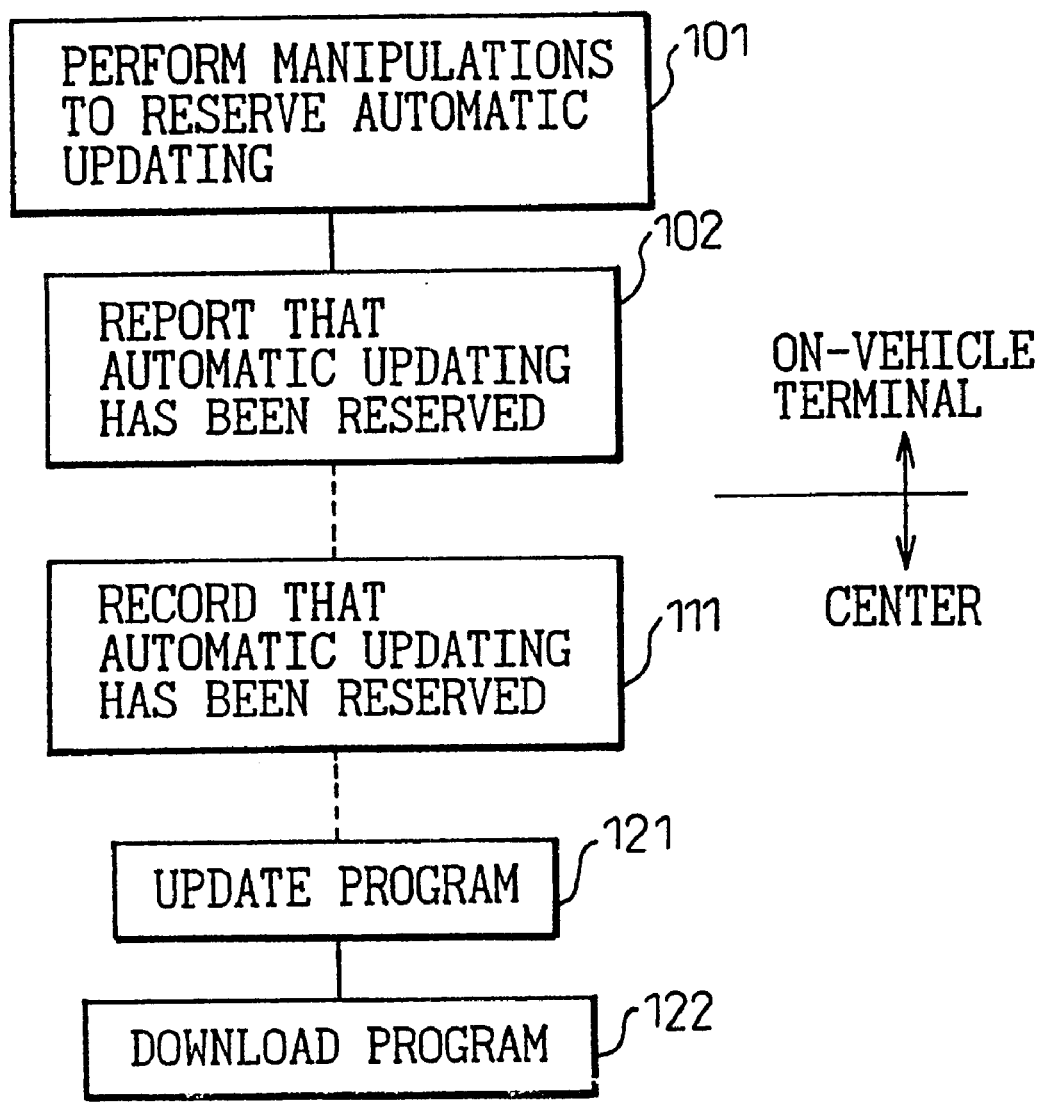

COMMUNICATION SYSTEM FOR COMMUNICATION BETWEEN IN-VEHICLE TERMINALS AND CENTER, AND IN-VEHICLE TERMINAL EMPLOYED IN COMMUNICATION SYSTEM

CROSS-REFERENCE TO RELATED APPLICATIONS

This application is a divisional application of application Ser. No. 10/105,359, filed Mar. 26, 2002, now pending, which is a divisional application of application Ser. No. 09/461,423, filed Dec. 16, 1999, now pending.

BACKGROUND OF THE INVENTION

1. Field of the Invention

The present invention relates to a communication system having in-vehicle terminals and a center (an information center) interconnected by radiocommunication. Moreover, the present invention relates to an in-vehicle terminal employed in the communication system.

2. Description of the Related Art

There is a communication system in which computer programs, to be installed in in-vehicle terminals, are distributed from a center by radiocommunication or the like. In the communication system, when a user wants to install a program such as a navigation system or video game in his/her in-vehicle terminal, or when a user wants to update an installed program, the user issues a request for downloading a program from his/her in-vehicle terminal to the center. The center downloads the requested program to the in-vehicle terminal by radiocommunication or the like.

At this time, the center wants to check if downloading the program to the in-vehicle terminal has been completed normally. Otherwise, the center wants to check if the downloaded program is operating normally while being compatible with the software and hardware environment of the in-vehicle terminal. Through this checking, the center confirms that the program has been distributed to the user. At the same time, the in-vehicle terminal can be kept safe. Moreover, after checking, the center can charge the user for the service.

In contrast, in conventional communication systems, a center does not have a means for performing the checking. After a program is delivered to an in-vehicle terminal, the program is at the user's disposal. The center cannot therefore sell a program even after confirming that the program satisfies the user. Moreover, even if an abnormality occurs during downloading or after activation of a program, the center cannot cope with it swiftly.

SUMMARY OF THE INVENTION

This application claims priority from Japanese Application No. 11-9649, filed Jan. 18, 1999, the contents of which are incorporated hereinto by this reference.

An object of the present invention is to provide a communication system for downloading programs from a center to in-vehicle terminals. Herein, the center can check if downloading has been completed normally or if a downloaded program is operating normally in an in-vehicle terminal.

The present invention has been devised in order to accomplish the above object. According to the present invention, there is provided a communication system having in-vehicle terminals and a center interconnected by radiocommunication or the like. Herein, after a program is downloaded from the center to an in-vehicle terminal, the in-vehicle terminal transmits information, which indicates that the program has been activated, to the center according to the timing of activating the downloaded program. The timing of activating the program includes the timing that the program is activated first and the timing that the program has been activated a certain number of times or more.

Consequently, the center becomes aware that the program has been downloaded without any problem and that the program has been activated normally. The center can thus confirm that the user's in-vehicle terminal is safe. Moreover, the center can use the results of checking as a criterion for charging the user.

According to the present invention, there is provided an in-vehicle terminal in which, if the state of communication becomes improper during downloading of a program, downloading is suspended, or downloading is automatically restarted. When downloading is suspended, if necessary, the in-vehicle terminal requests downloading of the program again. For automatically restarting downloading, when the state of communication becomes improper, the state of downloading attained when communication is cleared is recorded. When the state of communication is recovered, the state of downloading is reported to the center. According to the state of downloading reported from the in-vehicle terminal, the center restarts downloading of the program from the middle of the program, or more particularly, downloading of a portion of the program that has not been transmitted.

According to the present invention, the in-vehicle terminal has either of a facility for suspending downloading when the state of communication becomes improper and a facility for automatically restarting downloading. Alternatively, both the facility for suspending downloading and the facility for automatically restarting downloading may be made available so that a user can select either of them.

Furthermore, according to the present invention, the in-vehicle terminal can cope with an event such as an ACC power supply being turned off during downloading. As far as an in-vehicle terminal is concerned, when an ignition key is removed during downloading, an ACC power supply may be turned off. According to the present invention, the power supply of the system is changed from the ACC power supply to a +B power supply that is a backup power supply in order to continue downloading. Otherwise, downloading may be suspended or automatically restarted. Even in this case, a user can select the suspending facility or the automatically restarting facility.

According to the present invention, when a program is downloaded from a center to an in-vehicle terminal or when a downloaded program is operated in an in-vehicle terminal, if any trouble occurs, a countermeasure can be taken quickly. Consequently, the users' jobs are hardly interrupted and the users' satisfaction can be upgraded. Moreover, when it is necessary to charge users for services, it can be judged correctly whether users should be charged.

BRIEF DESCRIPTION OF THE DRAWINGS

The above object and features of the present invention will be more apparent from the following description of the preferred embodiment with reference to the accompanying drawings, wherein:

FIG. 12 is a flowchart describing a procedure for automatically updating a program in the communication system shown in FIG. 3.

DETAILED DESCRIPTION OF THE PREFERRED EMBODIMENTS

A communication system and an in-vehicle terminal in which the present invention is implemented will be described in conjunction with the drawings below.

(First Embodiment)

Figure 1:
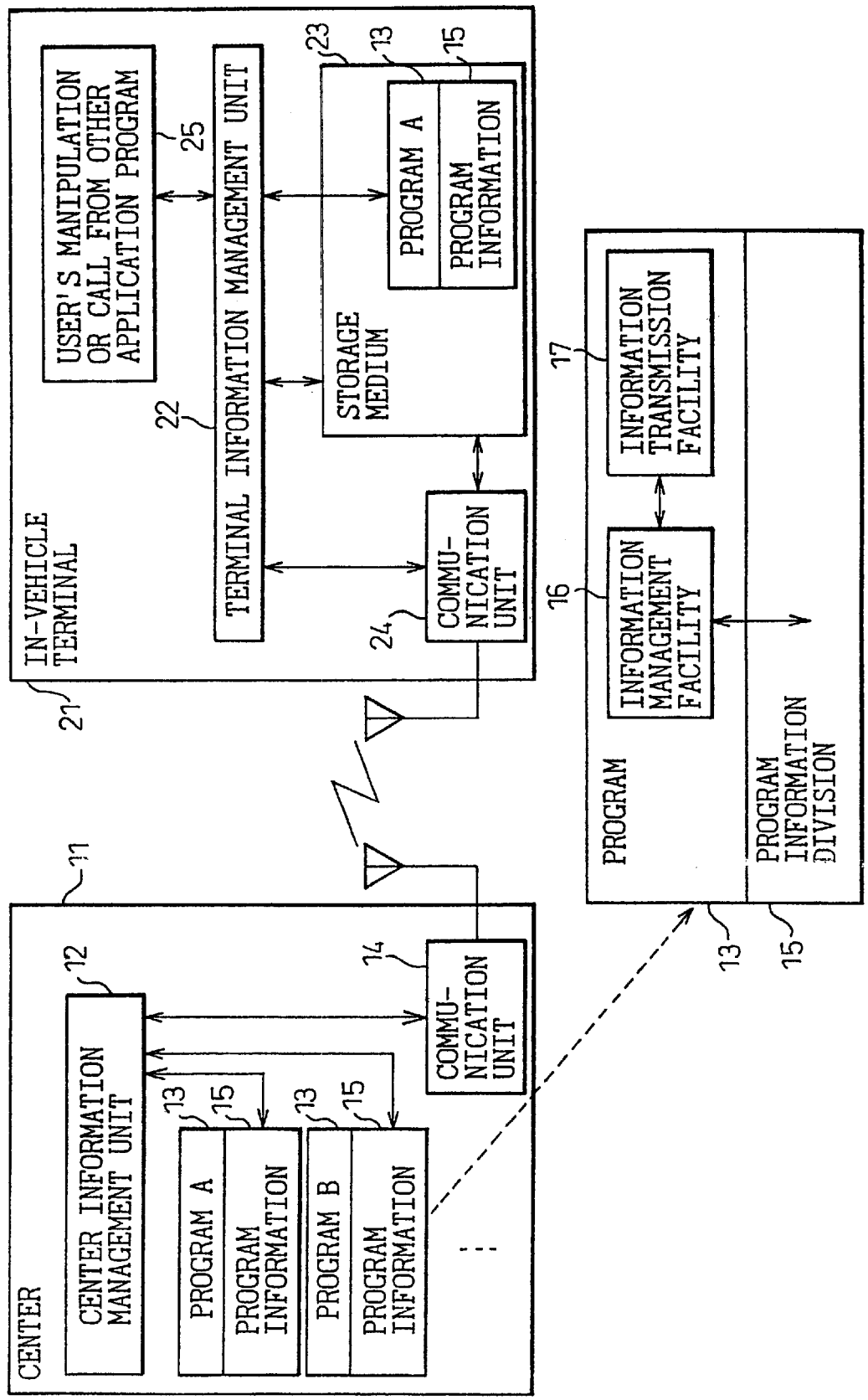
FIG. 1 shows the configuration of a first example of communication systems in which the present invention is implemented.

FIG. 1 shows the configuration of a communication system accommodating a center and in-vehicle terminals.

A center 11 has a center information management unit 12, a plurality of programs 13 to be distributed, and a communication unit 14. The center information management unit 12 includes a CPU and others, and distributes or updates the programs 13. The communication unit 14 transmits and receives data to and from each in-vehicle terminal 21.

Program information 15 that is information concerning a program itself is appended to each program 13. The program 13 includes, in addition to a program itself, an information management facility 16 and an information transmission facility 17. The information management facility 16 manages the program information 15, and the information transmission facility 17 transmits the program information from the in-vehicle terminal 21 to the center 11. The program 13 is transmitted externally by the communication unit 14 under the control of the center information management unit 12.

The in-vehicle terminal 21 consists of a communication unit 24, a storage medium 23, a terminal information management unit 22, and an input unit 25. The communication unit 24 transmits and receives data to and from the center 11. The program 13 downloaded from the center 11 is stored in the storage medium 23. The terminal information management unit 22 is formed with a CPU and others. The input unit 25 outputs a trigger pulse when manipulated by a user or when called by any other application program.

In the illustrated communication system, when a request for downloading a program is issued by the in-vehicle terminal 21, the center 11 transmits the requested program 13. At this time, the center information management unit 12 updates such information as a date of transmission, a time of transmission, and the number of times, by which a program has been activated, in the program information 15. The center information management unit 12 appends the program information 15 to the program 13. The communication unit 14 transmits the program 13.

When downloading terminates normally, the in-vehicle terminal 21 stores the program 13 and program information 15, which are received by the communication unit 24, in the storage medium 23.

Figure 2:
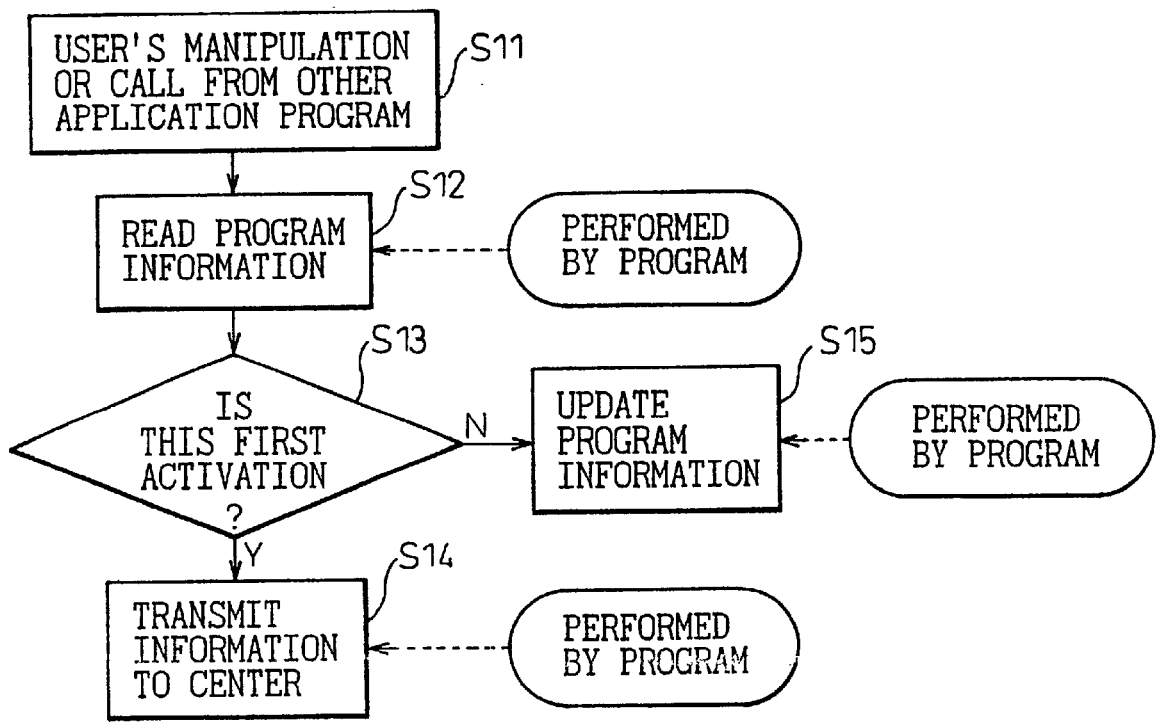
FIG. 2 is a flowchart describing processing performed in the communication system shown in FIG. 1.

FIG. 2 is a flowchart describing a procedure according to which the in-vehicle terminal 2 reports normal termination of downloading to the center 11.

When a user performs manipulations to select a program 13 or when the program 13 is called by any other application program, a trigger pulse is sent from the input unit 25 to the terminal information management unit 22 (step S11). Consequently, the terminal information management unit 22 activates the program 13. The program 13 is then activated to operate. Moreover, the information management facility 16 of the program 13 reads the program information 15 from the program information division (step S12). The information management facility 16 then checks the number of times by which the program has been activated in order to judge whether this activation is the first activation (step S13).

If this activation is the first activation, the program information 15 is updated at step S14. The information transmission facility 17 is used to transmit the program information 15 to the center 11. If this activation is not the first activation, the program information 15 is updated at step S14. The number of times of activation is incremented by one.

At the center 11, when information is received from the in-vehicle terminal 21, the information is analyzed. It is thus checked if downloading the program to the in-vehicle terminal 21 has been completed correctly and if the program 13 has been activated normally.

(Second Embodiment)

Figure 3:
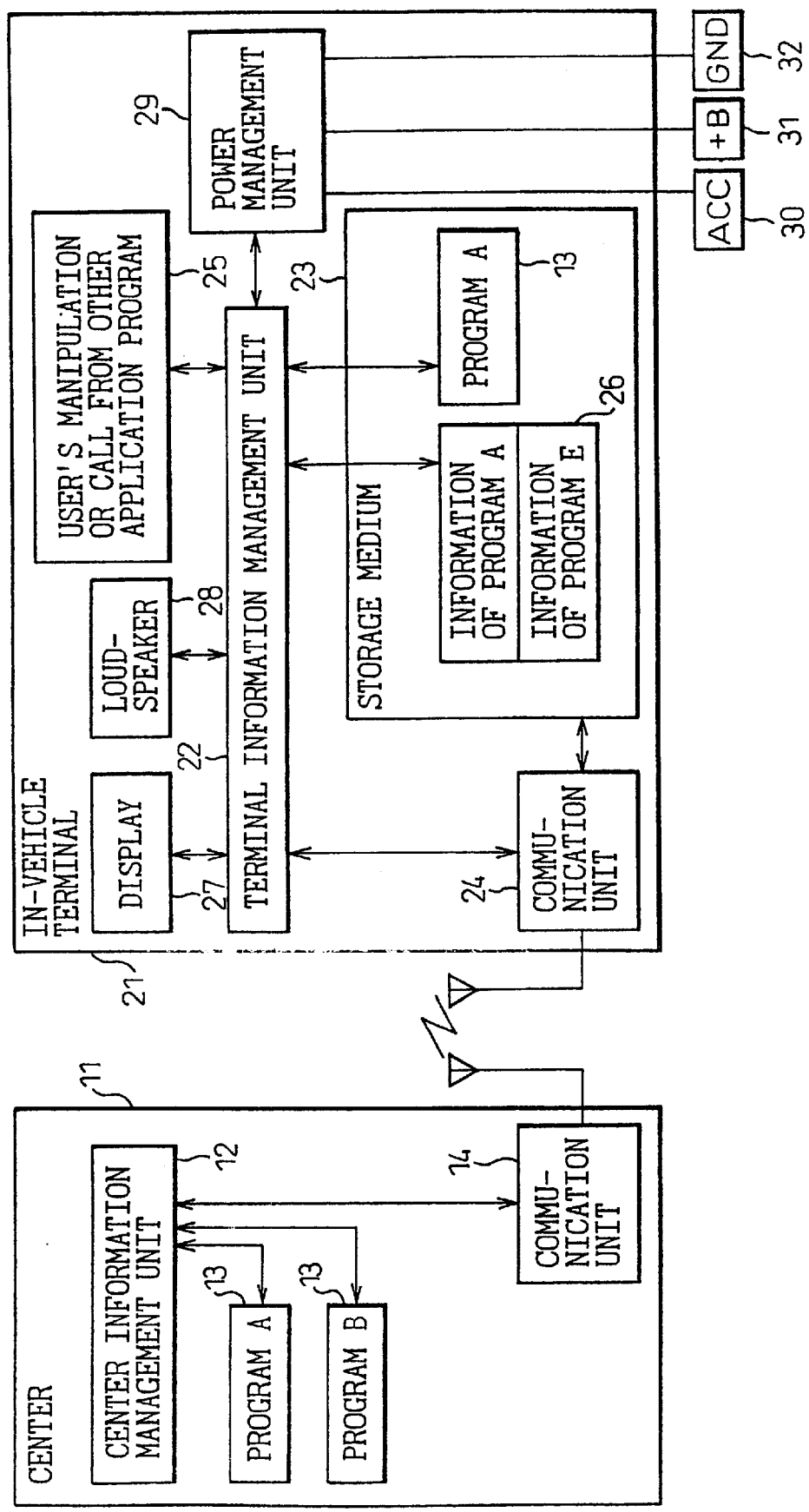
FIG. 3 shows the configuration of a second example of communication systems in which the present invention is implemented.

FIG. 3 shows another example of communication systems. In the first embodiment, a program to be downloaded from the center 11 checks, by itself, whether downloading has been completed normally and the program has been activated normally. In this embodiment, the terminal information management unit 22 in the in-vehicle terminal 21 performs the checking.

Many components shown in FIG. 3 are identical to those shown in FIG. 1. Only those components different from those in FIG. 1 will be described below.

The center 11 is provided with programs (programs A, B, etc.) only as the programs 13 to be distributed. Program information 26 that is information concerning a program itself is created by the in-vehicle terminal and stored therein. The in-vehicle terminal 21 receives a program 13 and stores it in the storage medium 23. At this time, program information 26 including a date of downloading and the number of times of activation is produced and stored in the storage medium 23.

The in-vehicle terminal 21 further includes a display 27, a loudspeaker 28, and a power management unit 29. The power management unit 29 is connected to an ACC power supply 30, a +B power supply 31, and a ground 32. The +B power supply 31 is a power supply for supplying power directly from a battery, and is used as a backup power supply for a memory. The ACC power supply 30 is a power supply for supplying power from the +B power supply 31 via an ignition key. When the ignition key is turned on, power is supplied from the ACC power supply 30 to every load. When the ignition key is turned off, the ACC power supply is turned off. The power management unit 29 normally selects the ACC power supply 30 as the power supply of the system, and, if necessary, changes the ACC power supply 30 to the +B power supply 31.

Figure 4:
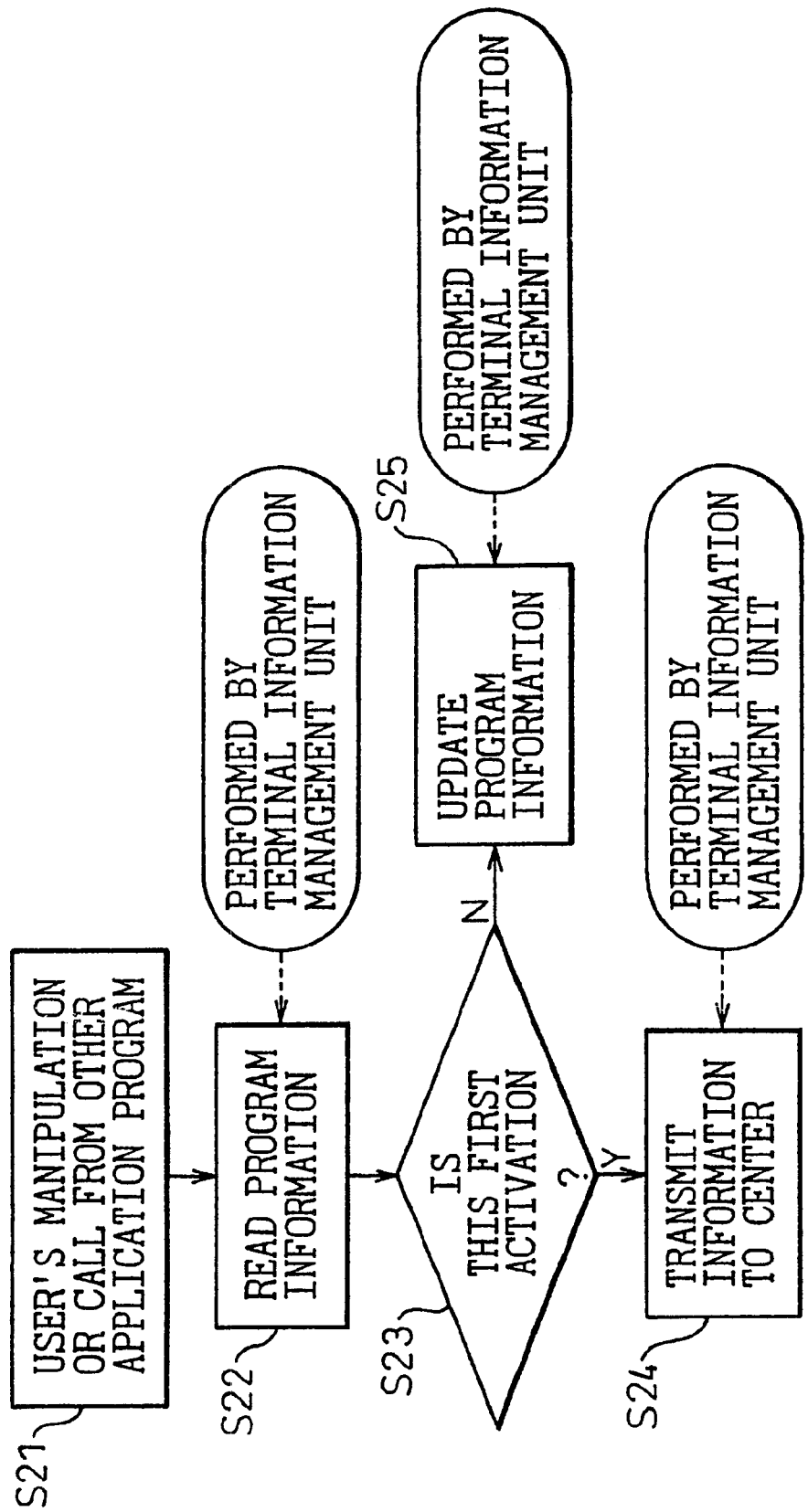
FIG. 4 is a flowchart describing processing performed in the communication system shown in FIG. 3.

FIG. 4 is a flowchart describing a procedure for reporting normal termination of downloading from the in-vehicle terminal 21.

Steps S21 to S25 in the flowchart of FIG. 4 are identical to steps S11 to 15 in FIG. 2. Repetition will be avoided. However, according to the procedure described in FIG. 2, steps S11 to S15 are carried out by the program 13 itself. Steps S21 to S25 in FIG. 4 are carried out by the terminal information management unit 22. This is the main difference.

(Third Embodiment)

Next, a description will be made of a procedure for coping with a failure that occurs in downloading a program from the center 11 to the in-vehicle terminal 21. Herein, downloading shall be performed in the communication system shown in FIG. 3. However, the procedure can be adapted to the communication system shown in FIG. 1 in which a program itself performs checking. When the procedure is carried out in the communication system shown in FIG. 1, the in-vehicle terminal must be provided with a loudspeaker and others.

Figure 5:
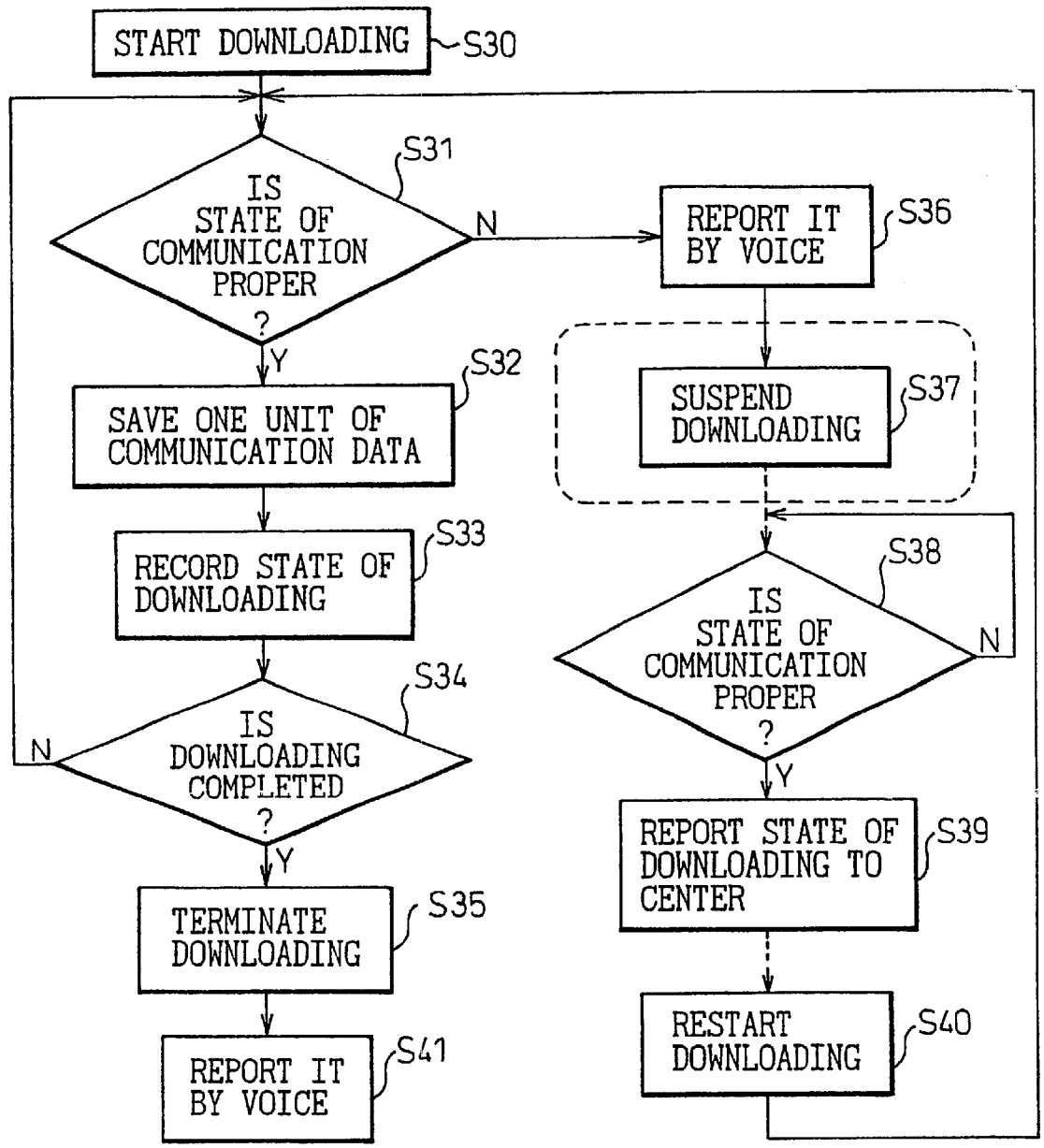
FIG. 5 is a flowchart describing a procedure for downloading a program in the communication system shown in FIG. 3.

FIG. 5 is a flowchart describing the procedure of downloading a program to the in-vehicle terminal 21 shown in FIG. 3. The procedure described in FIG. 5 is carried out by the terminal information management unit 22 in the in-vehicle terminal 21.

Downloading a program from the center 11 is started in response to a request issued from the in-vehicle terminal 21 (step S30). At step S31, it is judged whether the state of communication is proper. If the state of communication is proper, one unit of communication data is saved in the storage unit 23. At step S33, the state of downloading is recorded in the program information 26. At step S34, it is judged whether downloading is completed. If downloading is not completed, control is returned to step S31. The same actions are repeated until downloading of all programs is completed. Moreover, if it is judged at step S34 that downloading of all programs is completed, downloading is terminated at step S35. At step S41, the fact is reported to the user by voice through the speaker 28.

At step S31, if it is judged that the state of communication is improper, it is reported to the user by voice through the speaker 28 at step S36 that downloading is suspended. Control is passed to step S37.

In the first example shown in FIG. 5, downloading is suspended at step S37. The unit data stored in the storage medium 23 is deleted and processing is terminated. The suspension is reported to the user by voice. The user becomes aware of the fact that downloading is suspended. In this case, the user can re-issue a request for downloading the program to the center 11. The center 11 then transmits the program from the beginning.

In the second example shown in FIG. 5, step S37 of suspending downloading is skipped but control is passed to step S38. Step 38 then waits until the state of communication to be restored. When the state of communication becomes proper, control is passed to step S39. At step S39, the state of downloading is recorded in the program information 26, that is, what program data has been received is recorded in the program information 26. The state of downloading is then reported from the communication unit 24 to the center 11.

According to the state of downloading, the center 11 restarts downloading the program from a point in the program at which downloading was suspended. The in-vehicle terminal 21 restarts receiving a downloaded program (step S40). Thereafter, control is returned to step S31. Checking the state of communication and saving data are carried out continuously. At the in-vehicle terminal 21, when downloading is completed (step S35), the fact is reported to a user by voice (step S41).

Figure 6:
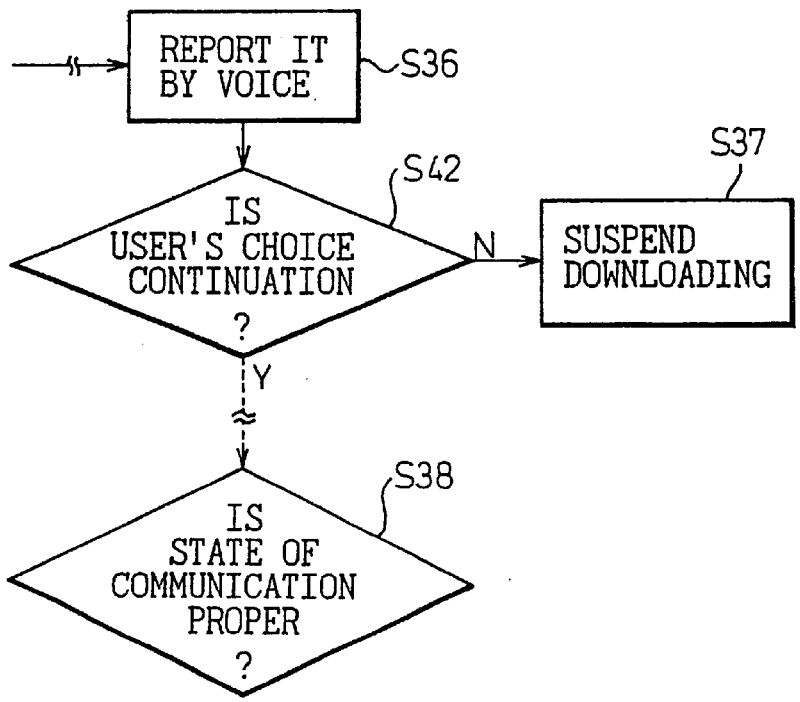
FIG. 6 is a flowchart describing a variant of the procedure described in FIG. 5.

FIG. 6 shows a variant of the procedure described in FIG. 5. According to the first and second examples described in FIG. 5, if the state of communication becomes improper during downloading, either suspension of downloading or automatic restart thereof can be carried out. In the example described in FIG. 6, a means for suspending downloading when the state of communication becomes improper and a means for restarting downloading are included, and either of the means can be selected by a user. For the selection, the user manipulates the input unit 25 in advance.

FIG. 6 describes modified steps of steps S36 to S38 in FIG. 5.

When it is judged that the state of communication is improper (step S31 in FIG. 5), the fact is reported to a user by voice (step S36). It is then judged at step S42 whether a user's choice is automatic continuation. If suspension of downloading is selected, control is passed to step S37 and downloading is suspended. If automatic continuation is selected, control is passed to step S38. Hereinafter, step S38 and subsequent steps similar to those in FIG. 5 are carried out. When the state of communication becomes proper, downloading is restarted.

(Fourth Embodiment)

The power management unit 29 in the in-vehicle terminal 21 usually selects the ACC power supply 30 as the power supply of the system. If the ignition key is removed during downloading, the ACC power supply 30 is turned off and downloading is suspended. The present embodiment is devised to cope with this event.

Figure 7:
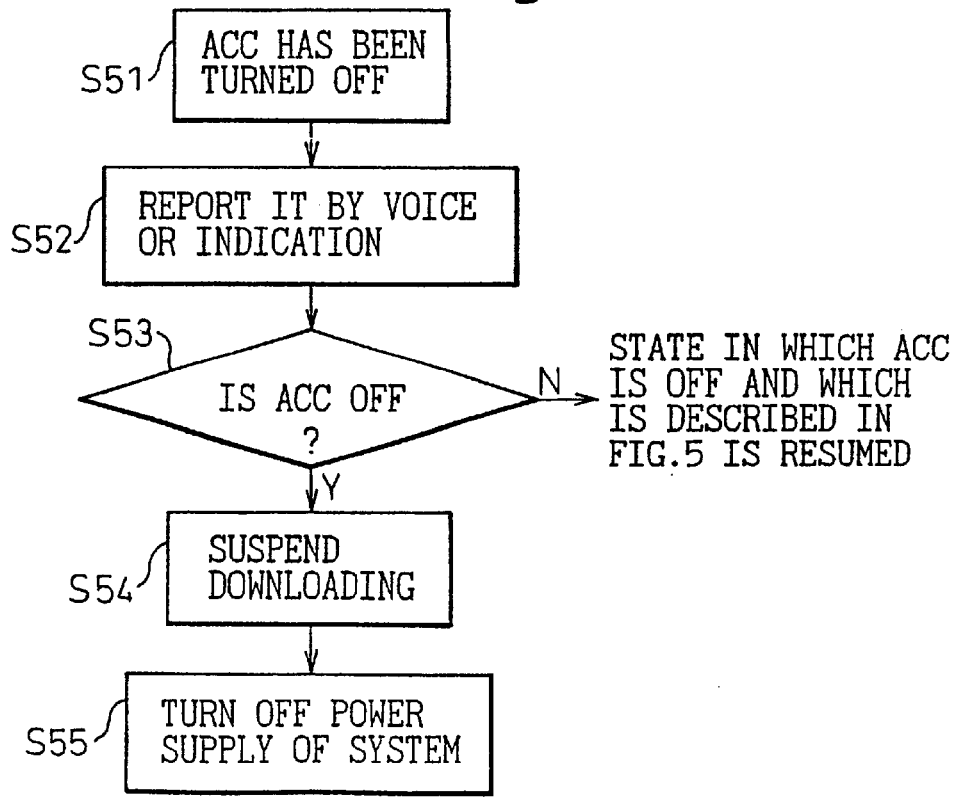
FIG. 7 is a flowchart describing a first example of procedures for coping with an event that the ACC power supply of the communication system shown in FIG. 3 is turned off.

FIG. 7 describes actions to be performed when the ACC power supply 30 is turned off.

When detecting that the ACC power supply 30 is turned off, the power management unit 29 changes the power supply for supplying power to the in-vehicle terminal 21 from the ACC power supply to the +B power supply 31. Consequently, downloading is continued. Moreover, when the ACC power supply 30 is restored, the power management unit 29 changes the power supply for supplying power to the in-vehicle terminal 21 from the +B power supply to the ACC power supply 30.

When the ACC power supply 30 is turned off, the power management unit 29 sends an interrupt to the terminal information management unit 22. The terminal information management unit 22 keeps operating owing to the +B power supply 31. With the interrupt produced because the ACC power supply 30 is turned off, a procedure described in FIG. 7 is started (step S51). It is reported to a user using voice produced by the loudspeaker 28 or using indication made by the display 27 that the ACC power supply 30 has been turned off (step S52).

Thereafter, the state of the ACC power supply 30 is checked (step S53). If the ACC power supply 30 is restored to the on state, the state attained before the interrupt is issued and described in FIG. 5 is resumed. If the ACC power supply 30 is restored immediately by manipulating the ignition key, downloading can be continued. In this case, voice may be produced or an indication may be provided by the display. If the off state of the ACC power supply 30 continues, downloading is suspended (step S54). The power management unit 29 is instructed to turn off the power supply of the system (step S55).

To restart downloading, a user turns on the ignition key. After power is supplied to the in-vehicle terminal 21, manipulations are performed to issue a request for downloading to the center 11. The center 11 transmits a program 13 to the in-vehicle terminal 21 from the beginning.

According to the present embodiment, when the ACC power supply 30 is turned off because the ignition key is removed during downloading, the state can be reported to a user. Moreover, if the off state of the ACC power supply 30 is transient, downloading can be restarted automatically.

(Fifth Embodiment)

According to the procedure described in FIG. 7, when it is detected that the ACC power supply 30 is off, downloading is suspended. In contrast, according to this embodiment, even after the ACC power supply 30 is turned off, downloading can be continued using the +B power supply 31.

Figure 8:
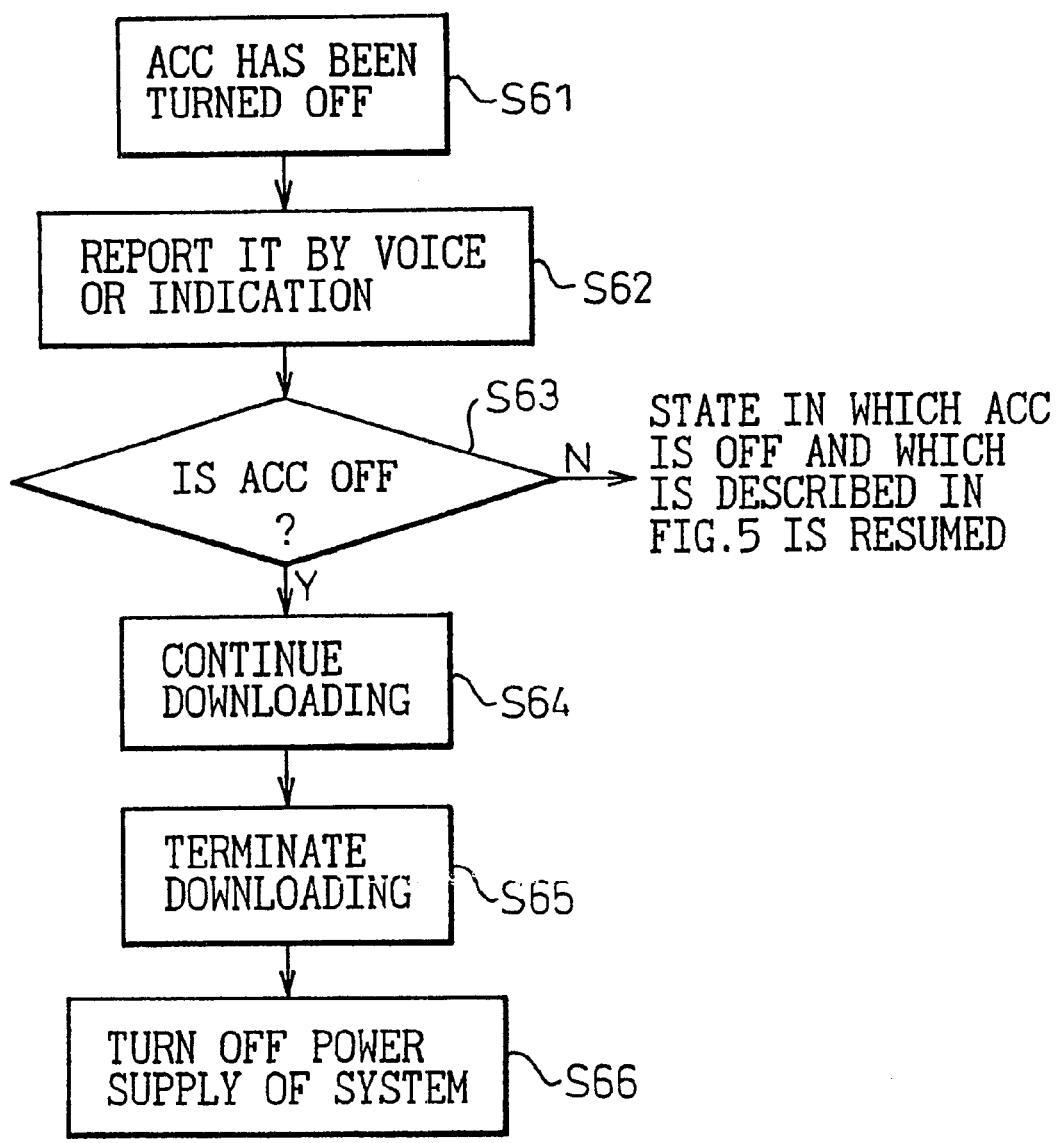
FIG. 8 is a flowchart describing a second example of procedures for coping with the event that the ACC power supply of the communication system shown in FIG. 3 is turned off.

FIG. 8 describes a procedure of continuing downloading using the +B power supply 31 after the ACC power supply 30 is turned off. Steps S61 to S63 in FIG. 8 are identical to steps S51 to S53 in FIG. 7. Reiteration will be avoided. At step S63, if it is detected that the ACC power supply 30 is still off, control is passed to step S64 in this embodiment. Downloading is continued using the +B power supply 31. When downloading is completed (step S65), the power management unit 29 turns off the power supply of the system (step S66).

(Sixth Embodiment)

Figure 9:
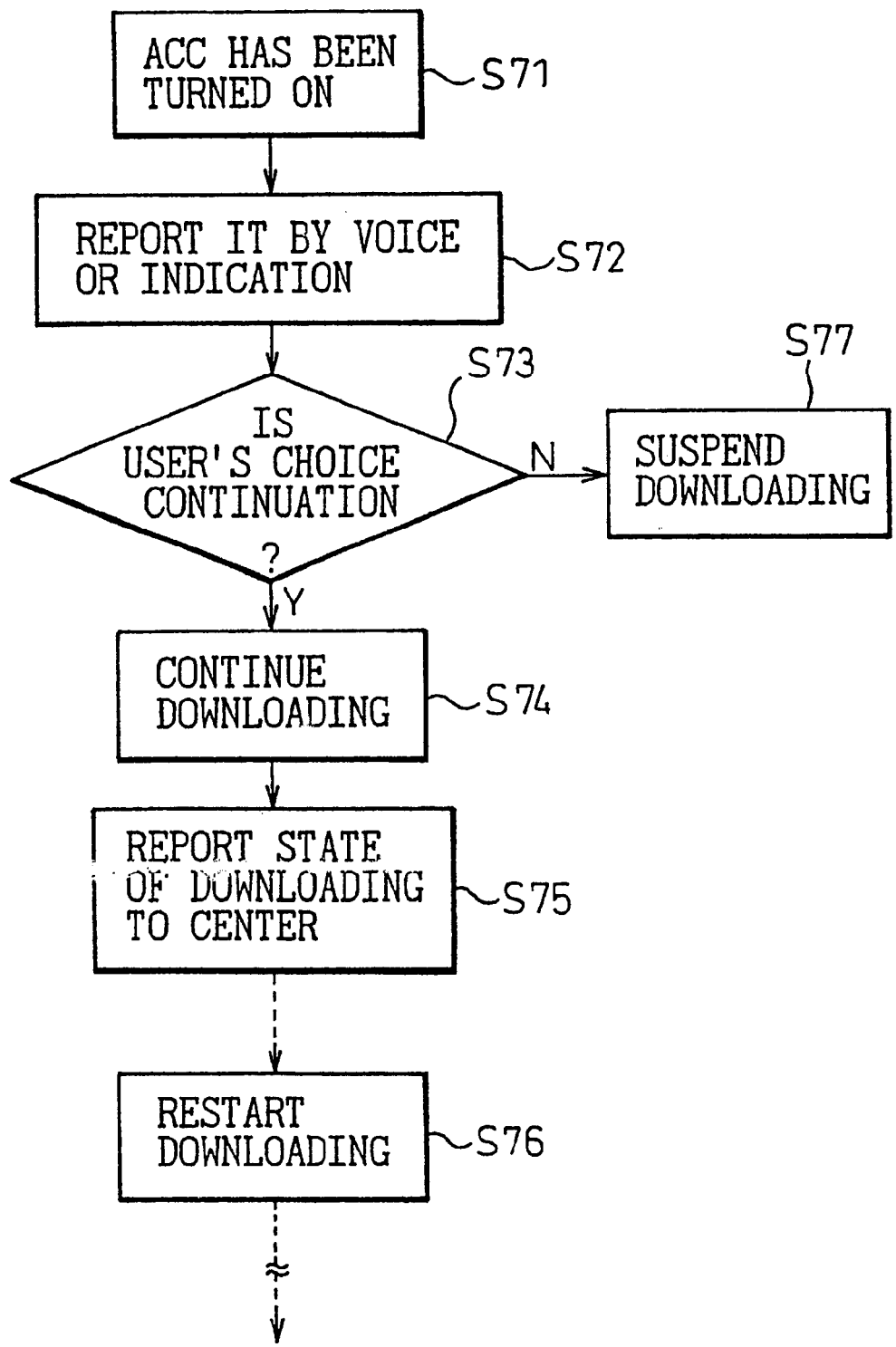
FIG. 9 is a flowchart describing a third example of procedures for coping with the event that the ACC power supply of the communication system shown in FIG. 3 is turned off.

FIG. 9 describes an example of procedures according to which a user can select in advance whether downloading is suspended or continued if the ACC power supply 30 is turned off during downloading.

Steps S71 and S72 are identical to steps S51 and S52 in FIG. 7. When a report is made to a user at step S72, it is judged at step S73 whether the user has selected automatic continuation. The user uses the input unit 25 to select in advance whether downloading is suspended or continued automatically.

If suspension is selected, control is passed to step S77 and downloading is suspended. If automatic continuation is selected, control is passed to step S74. Downloading is continued using the +B power supply 31. At step S75, the state of downloading, that is, up to which unit data the program has been received is reported to the center 11. The procedure is then terminated.

When the ACC power supply 30 is recovered, the power management unit 29 changes the power supply of the system from the +B power supply 31 to the ACC power supply 30. The power management unit 29 reports the fact to the terminal information management unit 22. With this report, an interrupt is produced at step S76. A request for downloading is sent to the center 11. The center 11 transmits data succeeding to data, which was transmitted at the time of suspension of downloading, according to the state of downloading reported at step S75.

In the example described in FIG. 9, when downloading is restarted at step S76, the center 11 may transmit the program 13 from the beginning. In this case, at step S75, the terminal information management unit 22 deletes the program that was stored up to the middle thereof.

In a variant of the procedure described in FIG. 9, steps S74 to S76 may be replaced with steps S64 to S66 described in FIG. 8. In this case, when a user selects that if the ACC power supply is turned off, downloading is continued, the +B power supply 31 is used to continue downloading. After downloading is terminated, the power supply of the system is turned off.

(Seventh Embodiment)

A description has been made of a means for checking whether downloading has been completed without any problem. Next, a description will be made of a means enabling the center 11 to check whether after downloading is completed without any problem, a program is operating normally while being compatible with the software and hardware environment of an in-vehicle terminal.

Figure 10:
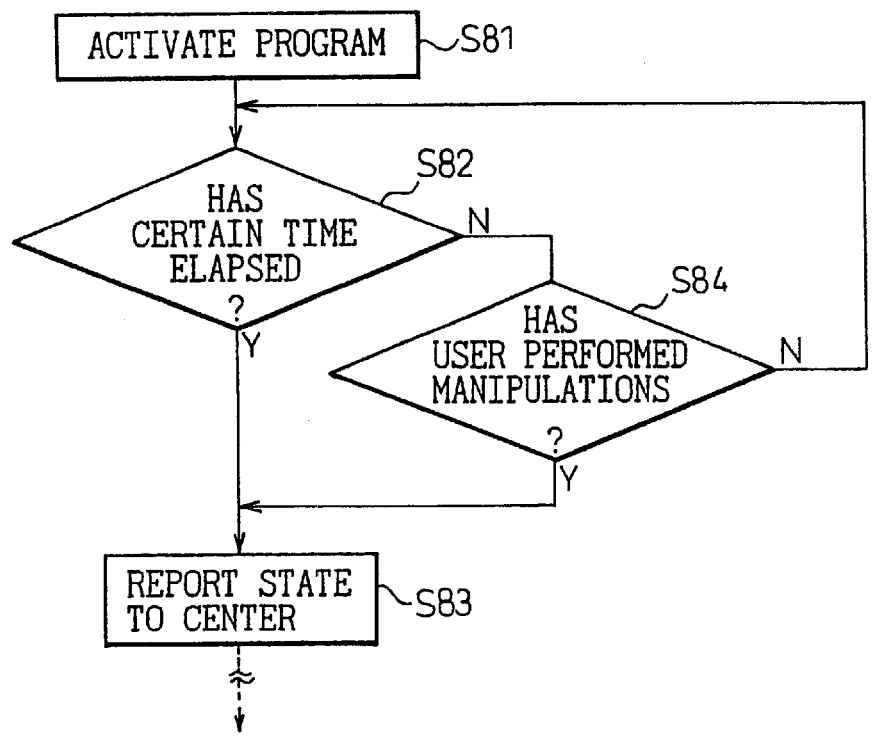
FIG. 10 is a flowchart describing a first example of procedures for checking whether a program has been activated normally in the communication system shown in FIG. 3.

FIG. 10 describes an example of procedures according to which when a certain time has elapsed after activation of a program, it is judged that the program is operating normally.

When a user performs manipulations or when any other application program calls a program, a trigger pulse is produced by the input unit 25. The terminal information management unit 22 activates the program (step S81). The program 13 operates continuously after activated. The terminal information management unit 22 waits until a certain time has elapsed (step S82). When the certain time has elapsed, it is reported to the center 11 that the program has been activated and the certain time has elapsed (step S83). At this time, the fact that a report is sent to the center 11 may be indicated on the display 27.

Moreover, even when the certain time has not elapsed, if the user satisfies the action of the program, the user may perform predetermined manipulations on the input unit (step S84). Thus, it is reported to the center 11 that the program has been activated normally. The step S84 may be omitted.

Thus, the center 11 can be aware of the fact that downloading has been completed without any problem and a program is operating normally.

(Eighth Embodiment)

Figure 11:
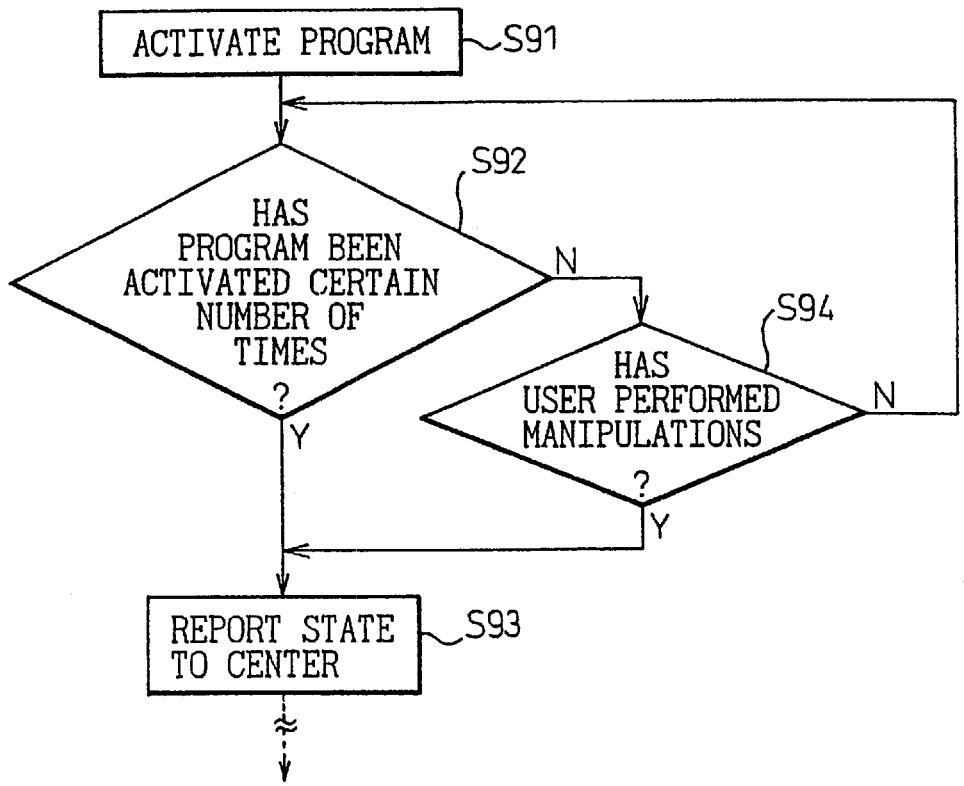
FIG. 11 is a flowchart describing a second example of procedures for checking whether a program has been activated normally in the communication system shown in FIG. 3.

FIG. 11 describes an example of procedures according to which when the number of times by which a program 13 has been activated exceeds a certain number of times, it is judged that the program is operating normally.

Step S91 in FIG. 11 is identical to step S81 in FIG. 10. When a user performs manipulations or when any other application program calls a program, the program is activated. With the program left activated, the number of times by which the program has been activated is checked (step S92). The number of times of activation is acquired from the program information 26. If the program has been activated a certain number of times or more, the fact is reported to the center 11 (step S93).

Even when the program has not been activated by the certain number of times, if the user performs predetermined manipulations (step S94), the fact is reported to the center 11 (step S93). Step S94 is analogous to step S84 in FIG. 10. Even in this embodiment, step S94 can be omitted.

(Ninth Embodiment)

In the aforesaid first to eighth embodiments, the center 11 downloads a program 13 in response to a request sent from the in-vehicle terminal 21. Moreover, every time a program is updated to a higher version, a user requests downloading of an updated program.

FIG. 12 described an example of procedures according to which when a program is updated, a request for downloading the updated program is issued automatically to the center 11. This obviates the necessity that a user must issue a request for downloading every time a program is updated.

A user performs predetermined manipulations on the input unit 25 to designate automatic updating (step S101). The terminal information management unit 22 reports to the program center 11 that automatic updating has been reserved (step S102). At this time, the user may designate that downloading is performed for automatic updating during a time band during which a vehicle is not driven, for example, at midnight.

In response to the request, the center 11 records, in the program information 15, that automatic updating has been reserved (step S1).

When the center 11 has updated a program 13 (step S121), the center 11 downloads the program 13 to users who have reserved automatic updating (step S122). At this time, if a time band is designated, the program is transmitted during the time band. In this case, when sensing that the in-vehicle terminal 21 is called by the center 11, the terminal information management unit 22 in the in-vehicle terminal 21 automatically turns on the power supply of the system. Thereafter, the program is downloaded according to the actions described in FIG. 5 and FIG. 6. Moreover, when downloading is terminated, the power supply of the system is turned off.

Thereafter, when the ACC power supply 30 is turned on, the terminal information management unit 22 indicates on the display 27 that automatic updating of the program has been carried out. The user becomes aware of the fact that downloading has been carried out.

According to the present invention, there is provided a communication system for downloading programs from a center to in-vehicle terminals. The center can readily check whether downloading has been completed normally or a program is operating normally in a in-vehicle terminal.

What is claimed is:

1. An in-vehicle terminal employed in a communication system for downloading programs from a center to in-vehicle terminals, comprising:
   a communicating unit communicating with said center;
   a storage unit in which a program downloaded from said center via said communicating means is stored;
   a detecting unit detecting whether an ACC power supply has been turned off;
   a storing unit, when a program is downloaded from said center to said in-vehicle terminal, if said detecting unit detects that the ACC power supply has been turned off, storing information indicating a state of downloading attained at that time; and
   a transmitting unit, when the ACC power supply is restored, transmitting the stored information indicating the state of downloading to said center.

2. An in-vehicle terminal employed in a communication system for downloading programs from a center to in-vehicle terminals, comprising:
   a communicating unit communicating with said center;
   a storage unit in which a program downloaded from said center via said communicating unit is stored;
   a selecting unit selecting suspension of downloading or continuation thereof;
   a suspending unit, when said selecting unit selects suspension, if it is detected that an ACC power supply has been turned off, autonomously suspending downloading;
   a storing unit, when said selecting unit selects continuation, if it is detected that the ACC power supply has been turned off, storing information indicating a state of downloading attained at that time; and
   a transmitting unit, when communication is restarted, transmitting the stored information indicating the state of downloading to said center.

* * * * *

UNITED STATES PATENT AND TRADEMARK OFFICE
CERTIFICATE OF CORRECTION

PATENT NO. : 6,760,650 B2
DATED : June 6, 2004
INVENTOR(S) : Shinichi Hayashi et al.

It is certified that error appears in the above-identified patent and that said Letters Patent is hereby corrected as shown below:

Title page,
Item [75], Inventors, please change the list of inventors to -- Shinichi Hayashi, Kobe (JP); Akihito Tada, Toyota (JP); Hironobu Sugimoto, Toyota (JP); Akimasa Nanba, Okazaki-shi (JP); Toshiaki Egawa, Yokohama (JP) --
Item [56], References Cited, U.S. PATENT DOCUMENTS, please add
-- 6,195,546  2/2001  Leung et al. --

Signed and Sealed this

Tenth Day of May, 2005

JON W. DUDAS
*Director of the United States Patent and Trademark Office*